July 27, 1954
R. L. BRUNSING
2,684,907
METHOD OF SHIPPING LETTUCE AND OF PREPARING
LETTUCE AND THE LIKE FOR SHIPMENT
Filed June 5, 1951
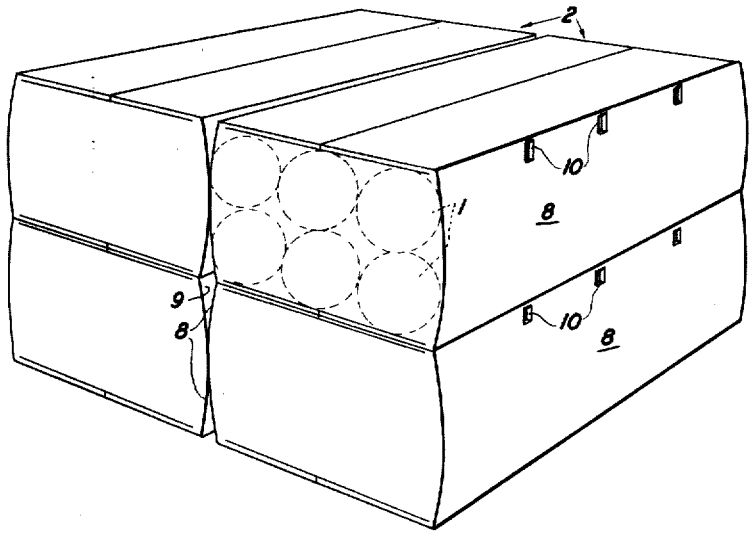
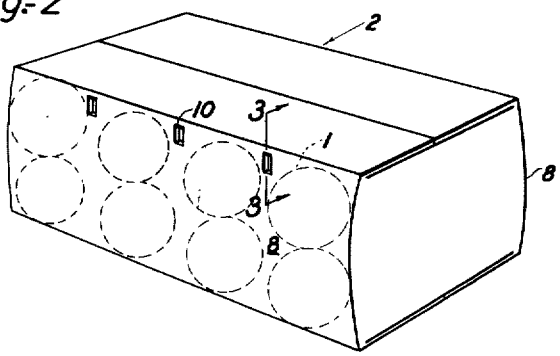
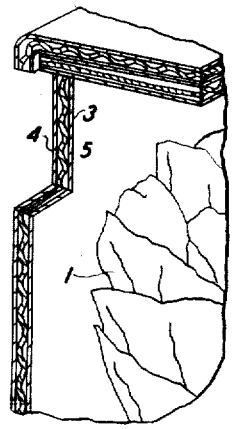
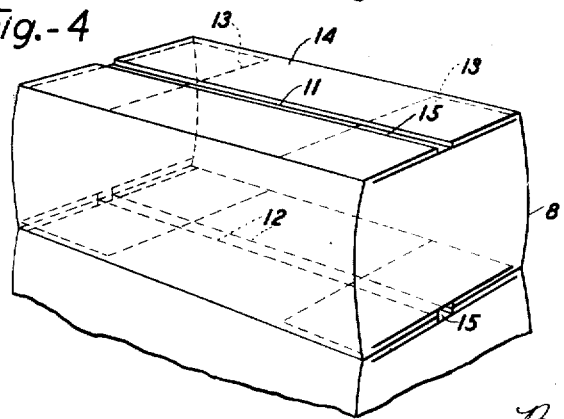
INVENTOR.
REX L. BRUNSING
BY
ATTORNEYS Patented July 27, 1954

2,684,907

UNITED STATES PATENT OFFICE 2,684,907

METHOD OF SHIPPING LETTUCE AND OF PREPARING LETTUCE AND THE LIKE FOR SHIPMENT

Rex L. Brunsing, San Francisco, Calif.

Application June 5, 1951, Serial No. 230,021

5 Claims. (Cl. 99—193)

This invention relates to a method of packing and shipping vegetables, such as lettuce, spinach, etc., that require the removal of the field heat and a relatively low (but above freezing) temperature during shipment and storage.

Lettuce is an example of a leaf vegetable that has heretofore presented difficult problems that the present invention has solved, and other vegetables may be treated in the same manner as lettuce, provided they carry sufficient free evaporatable surface moisture.

Taking lettuce as an example, the heads as taken from the field have substantially the same temperature as the atmosphere at the time they were so taken. They may be termed "field heat" and said temperature is usually within about 15° of 85° F., more or less. Obviously, the heads will rapidly deteriorate after being severed from the roots, unless the field heat is removed and they are kept at a sufficiently low temperature, preferably between about 32° and 40° during shipment and storage.

Heretofore, the heads taken from the fields have been packed in relatively expensive wooden crates in layers with a layer of ice between the layers of head. Specially prepared paper is required to protect the heads as much as possible from the water resulting from melting of the ice, which increases the costs.

After the lettuce has been crated, as described, they have heretofore been loaded into refrigerator cars in stacks with the stacks in spaced relationship to each other to permit more ice to be packed between stacks, and after such ice has been packed, the entire load is covered with a layer of ice, and the ice bunkers at the ends of the car are filled with ice.

By the above method, approximately 40,000 pounds of ice are required for each car, there being about 30,000 pounds within, between and over the crates, and 11,000 pounds in the bunkers. At best, by the above method, the removal of the field heat is slow and from 36 to 72 hours elapse before the heads are all uniformly cooled to their centers. The warm air between the layers of leaves is a very effective heat insulator. During this time there is a fast melting of the ice forming water, which water is one of the effective causes of deterioration and discoloration of the lettuce. Tip burn or the marginal browning of the leaves and moisture results in slime and decay.

In recent years, lettuce, spinach and other leaf vegetables having free, evaporatable surface moisture, or residual moisture from washing, as in the case of carrots, have been successfully cooled commercially by placing the vegetables in conventional wooden crates and in an air evacuating or vacuum chamber and causing accelerated evaporation of the free moisture. Such cooling of lettuce to about 32° F. in a very small fraction of an hour or at the rate of about five degrees per minute enables the cooling of the lettuce to and through the heart of each head at a saving of from about 36 to 72 hours in time which means a directly proportional saving in storage space preceding shipment of the lettuce and almost immediate cooling of the lettuce after the heads have been severed from the roots. Obviously no ice is used in the pre-cooling step and the only further cooling required is to keep the temperature down.

In the above described vacuum cooling method, as already stated, the lettuce has been heretofore packed in the same type of wooden crates previously used, in which there have been relatively large spaces between the slats. Such open construction has been deemed necessary for the rapid cooling of the lettuce and to provide for free circulation of air. The 11,000 pounds bunker ice, or thereabout, was still necessary to keep the temperature down, and once the crated lettuce was unloaded at the terminal, a rapid transfer of heat would take place with the result that the heads would be at a much higher temperature by the time they reached the stores or were placed in storage.

One of the objects of the present is a method that eliminates the condition in which there is a free circulation of air in the refrigerator car and elsewhere between the heads of the packed lettuce, and which method provides for a more uniform temperature in the heads themselves and the cooling of the space within each container for said heads to the temperature of the cooled vegetables without the use of ice, or forced draft of cold outside air, or the transfer of heat through the walls of the containers, and which method also completely eliminates objectionable moisture.

A still further objective of the invention is the provision of a method of cooling and handling lettuce and the like in which the lettuce remains cool and free from outside moisture during shipment, unloading, and transfer into storage without the use of auxiliary or outside cooling whereby the lettuce will reach the market in perfect, unwilted condition, free from slime, decay, and discoloration.

A still further object of the invention is the provision of a method for cooling lettuec in cartons by accelerated evaporation of moisture on the leaves in the heads and in a manner whereby the lettuce will remain cool within the cartons when the atmospheric temperature outside the cartons is from thirty to fifty degrees higher than that of the heads, and where the outside atmospheric temperature is unusually high the difference may be even greater.

An additional object of the invention is the provision of cartons designed to permit rapid withdrawal of moist vapors from within the cartons, resulting from vaporization of moisture on the leaves within the heads that are packed in said cartons, while substantially preventing a rise in the temperature within the cartons due to convection.

Other objects and advantages will appear in the description and in the drawings.

In the drawings, Fig. 1 is a perspective view of several pairs of adjacent cartons in the stacks of an adjacent pair, said cartons illustrating suitable structure for carrying out the method. The end heads of lettuce at the near end of one of the cartons are shown in dash lines.

Fig. 2 is a perspective view of one of the cartons of Fig. 1 as seen more from one side, and the heads of lettuce within said carton along the near side are indicated in dash lines.

Fig. 3 is an enlarged fragmentary sectional view taken through a side and the top of a carton of Fig. 1 along an upper corner, a head of lettuce being indicated in full line.

Fig. 4 is a reduced size perspective view of a carton that differs somewhat from the cartons of Figs. 1, 2.

In detail, in the method of the present invention, the lettuce heads 1 (Figs. 1 to 3) are packed within cartons or boxes generally designated 2.

The size of the heads usually determines whether the heads are packed about 24 to the carton or about 30. If the heads are relatively large they are usually packed 24 to the carton or two layers of twelve each with four heads in rows lengthwise of the carton in each layer and three rows to each layer. Where smaller heads are packed there is usually an additional head in each of the six rows, or each of the three rows in each of the two layers has five heads. It is to be understood that exactly twenty-four or thirty heads are not necessarily in each carton, because there may be say from about twenty-four to about thirty heads, but an attempt is made to grade or select the heads so there will be about twenty-four large heads or about thirty smaller heads as above described. The lettuce so packed will normally run from about 35 to about 50 lbs in weight.

The dimensions of a typical carton for the above described pack is about 22 inches long by about 14 inches wide and about 10 inches high, and the same size carton is preferably used for all lettuce irrespective of the size of the heads.

It is important that the carton structure be such as to have good heat insulation properties, and therefore said cartons are preferably made of corrugated fiberboard or cardboard of the type having an inner liner 3 and an outer layer 4 (Fig. 3) of kraft paper between which is corrugated paper 5. The corrugations in the paper 5 provide an air space between layers 3, 4 whereby the walls of the carton are insulated against rapid transfer of heat therethrough.

Inasmuch as the present method uses the vacuum method of cooling, that is, the cooling of the heads by the accelerated evaporation of free moisture on the leaves within each head, said cartons may be packed in the field ready for loading into the refrigerator cars, provided the cartons are provided with openings through which the vapors of evaporation may be withdrawn when the cartons are placed in a vacuum chamber for effecting said accelerated evaporation.

This packing of the cartons in the field, ready for shipment, is not possible with the so called "wet pack" that uses ice. Where the conventional "wet pack" system is used the heads of lettuce must be handled twice, first when temporarily packed in crates in the field, and second when taken from said crates and repacked in the shipping crates with ice between the layers of lettuce in each crate. Thus the present method eliminates this costly item that is required by conventional method.

In the present method, it is important that the cartons, when packed, have openings adequate for the rapid withdrawal of the vapors of evaporation within each carton when the cartons are placed within a vacuum chamber, and yet in order to accomplish the desired results, the total cross sectional area of such openings must not be great enough to result in rapid or even moderately rapid heating of the air within the cartons by convection during shipment and subsequent handling. In the present invention, the lettuce remains cold or at substantially the temperature to which it was lowered by evaporation of a portion of its free moisture, during shipment in a refrigerator car that may be iced (in the bunkers only) to half capacity for a transcontinental trip, and during distribution of the cartons to store rooms and retail stores. Also the cartons will remain very cool inside during the normal period that the lettuce may be held in retail stores before sale.

When the cartons are fully packed, their opposite lateral sides 8 (Fig. 1) will bulge oppositely outwardly slightly, leaving a space 9 between the adjacent four corners of each multiple of four cartons consisting of the adjacent two pairs of cartons in the corresponding adjacent pairs of superposed tiers in each adjacent pair of stacks, as seen in Fig. 1. This space may be termed a secondary opening, being a through passageway extending horizontally from end to end of the cartons along their sides. The term "secondary" is employed in order to distinguish from openings in the cartons themselves, which will be called "primary" openings.

Formed in opposite sides 8 of each carton and along the upper edges of said sides are vertically elongated openings or slots 10. These primary openings will not be closed by adjacent cartons due to the bulges in the sides of the cartons and because they are restricted to the upper marginal portions of sides 8 and communicate with the aforesaid secondary openings.

In Figs. 1, 2 the openings 10 are seen to be three in number and are along each of the upper marginal portions of each carton at opposite sides of the carton. As seen in Fig. 2, there are four heads of lettuce in each of the rows extending longitudinally of the box, and as the openings 10 are equally spaced apart and from the ends of the carton, the openings will each be positioned between an adjacent pair of heads of lettuce. In other words, a head will not normally lie over an opening to obstruct passage of air therethrough.

If the carton contained thirty heads of lettuce, then there would be four equally spaced openings 10 on a side, instead of three.

In Fig. 4, the openings 11, 12 are shown as being at the top and bottom of each carton, the edges of each opening being defined by two of the end closure flaps 13 and two of the side closure flaps 14. This is not as satisfactory as the form of cartons shown in Fig. 2 inasmuch as it is possible for the center row of lettuce heads to close off the openings to a substantial degree, which would result in the lettuce in some cartons being cooled more efficiently than in other cartons.

In Fig. 4, the slots or openings 11, 12 are what will be called "primary" openings, and the secondary openings are the passageways 15 leading from said openings to the ends of the box.

The cartons of Figs. 1, 2 rely upon the secondary openings 9 for passage of the moist vapors of evaporation from the primary openings 10 into the vacuum chamber and from thence to the exhaust conduit, whereas the cartons of Fig. 4 rely upon the secondary openings 15 for the passage of said moist vapors from primary openings 11, 12 to said conduit.

The cartons are loaded into the vacuum cooling chamer in tiers or stacks, and when so loaded, the lettuce may be at a temperature exceeding 100° F., as may be the air within the cartons and the carton walls. Heretofore, when crates were used, free circulation of outside air through the body of lettuce within each crate, and through the crate, was possible. As the outside temperature went up or down, the temperature wihin the crate would have a corresponding change, due to convection. Where ice was the medium for cooling, the inside of the crates would be cooled by the ice within the crates and by conduction of heat through the walls since ice was between and over the crates.

With the present invention, the insides of the cartons are cooled by the vaporization of moisture in the heads of lettuce within each carton.

For satisfactory cooling of the lettuce and the interior of the cartons by the present method, it is imporant that the primary openings in each carton have a combined or total cross sectional area that is less than that which will permit free circulation of air between the inside and outside of the carton in normal handling, shipment and storage. In crates such free circulation is unavoidable and has heretofore been deemed necessary. However, the total cross sectional area of the openings in each carton must be sufficiently large, in the present instance, to permit substantially as rapid a withdrawal of the moist vapors from within the cartons during the vacuum cooling step, as would occur were the lettuce packed in crates.

For example, in a carton measuring say about 22 x 14 x 10 inches, and holding about 24 to 30 heads of lettuce having a net weight of about 35 to 50 lbs., it has been found that the total area of the openings along each side or at the top or bottom should be from about 2 to 4 square inches to enable the accomplishment of the desired results.

The area of the openings 10 and the weight of the lettuce bear a direct ratio to each other, but the area of the primary openings may be larger than the cross sectional area of the secondary openings in order to compensate for the normal possible variations in the effective area of the primary openings due to loose leaves tending at times to obstruct said primary openings. The secondary openings are not subject to such obstructions.

The total effective area for either the primary openings or the secondary openings for each carton, should be not less than .28 inch. The total area of the secondary openings for each carton, in Fig. 4, approximates this area and is not less than said area. In the case of Fig. 1, there may be more variance, but in any event it is not less than said amount.

Insofar as the total area of the primary openings in each carton is concerned, this is preferably equal, in square inches to substantially .07 to .1 times the number of pounds of lettuce in each carton. Thus if the weight of the lettuce is 40 lbs., the total area of the primary openings 10 in each side of each carton may be from about 2.8 square inches to about 4. square inches, or the same area will apply to either opening 11 or 12 of Fig. 4. The ratio of the total area of the primary openings to the weight of the lettuce in each carton is about .107 to .075 or substantially .07 to .1 and the ratio of the total area of the secondary openings for each carton to the weight of the lettuce may be from about .08 to .056 assuming a weight of from about 35 to 50 lbs. per carton with a total minimum cross sectional area of .28 square inch for the passageways 9 of each carton.

Thus it will be seen that each of the openings 10 in Figs. 1, 2 may be about an inch high by about a half inch wide, or about two inches high and about a quarter of an inch wide, making a total of about three square inches.

The positioning of the openings 10 along the upper sides of the cartons practically prevents any transfer of heat by convection, and the loss of heat when the structure of Fig. 4 is employed is relatively small. However, the positions of openings 11, 12 in Fig. 4 make it more likely that the lettuce leaves will obstruct the passage of air therethrough than in the case of Figs. 1, 2. The structure as defined in Figs. 1, 2 is preferable.

Upon the lettuce being packed in the cartons as above described, and placed in the vacuum chamber for cooling, the said lettuce is cooled with great rapidity and the air within the interiors of the cartons is also cooled to the same degree.

After such cooling, all that is necessary in each car into which the cooled lettuce is loaded, is to provide sufficient ice to maintain the lettuce at substantially its lowered temperature. The heat loss that might occur is due primarily to conduction, and as the walls of the cartons are of heat insulation material, such loss is small.

When the cartons are unloaded at their destination, their interiors are still cold and will remain so for a relatively long period of time when the cartons may be subjected to hot atmospheric air outside a refrigerated space. Here again, such heat losses as occur will primarily be due to conduction through the walls of the cartons.

The final results are that the elimination of icing in the cars (the bunkers themselves in the refrigerator cars are usually only half iced, or only about 6000 lbs. is used) results in it being possible to increase the pay load in each car by substantially 25% and to reduce the ice required from about 41,000 lbs. to about 6,000 lbs. The lettuce is packed in the cartons in the field, thus eliminating the cost and time required heretofore in repacking the lettuce at a packing station after it has once been packed in the field and brought to said station. Furthermore, the lettuce when delivered at its ultimate destination is free from slime and deterioration that is so common where conventional packing methods have heretofore been used.

In the cooling step, it is to be noted that the ratio of the area of the openings to the weight of the lettuce as herein described, enables the cooling of said lettuce at a relatively high vacuum at a rate of about five degrees per minute, and when the temperature of the lettuce heads is above but relatively close to 32° F. or to the freezing point of water, the evaporation under the relatively high vacuum is stopped and the containers are tightly packed in the refrigerator cars, and when so packed, it is immaterial whether the passageways 9 are in any kind of registration or whether the openings 10 or 11, 12 are or are not open or closed or are in registration with passageways 9 or 15.

I claim:

1. The method of packing and shipping leaf vegetables that comprises the steps of: packing the fresh leaf vegetables at atmospheric temperature within fiberboard cartons, leaves of the leaf vegetables so packed having free vaporizable water carried thereby, and said water being the only free moisture within said carton, closing said carton against substantially free circulation of outside air therethrough by convection, cooling the interiors of said cartons and said leaf vegetables by effecting rapid evaporation of said water through evacuation of the air within each carton until the temperature of said leaf vegetables is below 40° F. and above the freezing point of said water whereby the leaves of said leaf vegetables and the interior of said cartons is free from ice.

2. The method of packaging leaf vegetables that comprises the steps of: packing the fresh leaf vegetables and only the free vaporizable water that is carried by the leaves thereof within cartons of fiberboard in the field and at atmospheric temperature and substantially immediately after severence of said leaf vegetables from said stalks; closing said cartons against substantially free circulation of air therethrough by convection, then rapidly cooling the interiors of said cartons by causing rapid evacuation of air within said leaf vegetables, cartons, and space thereby causing evaporation of said moisture and continuing said evaporation until the temperature of said leaf vegetables is below 40° F. and said water is unfrozen and above 32° F. whereby said interiors of said cartons and said leaf vegetables will be free from ice, then discontinuing the evacuation of said air and the moisture of evaporation and admitting attenuated atmospheric air into said interiors until the pressure within said interiors is equal to atmospheric pressure.

3. The method of packaging leaf vegetables that comprises the steps of: packing the fresh leaf vegetables and only the free vaporizable water that is carried by the leaves thereof within cartons of fiberboard in the field and at atmospheric temperature and substantially immediately after the severance of said leaf vegetables from their stalks; closing said cartons against substantially free circulation of air therethrough by convection, then rapidly cooling the interiors of said cartons by causing rapid evacuation of air within said leaf vegetables, cartons, and space, thereby causing evaporation of said moisture and continuing said evaporation until the temperature of said leaf vegetables is substantially 32° F. and said water is unfrozen and slightly above 32° F. whereby said interiors of said cartons and said leaf vegetables will be free from ice, then discontinuing the evacuation of said air and the moisture of evaporation and admitting atmospheric air into said interiors and into said leaf vegetables at a temperature below that of the outside atmospheric air, and finally packing said cartons containing said leaf vegetables in a refrigerated space before any substantial change in the temperature of said leaf vegetables.

4. The method of packaging leaf vegetables for storage and for shipment that comprises the steps of: packing the freshly harvested leaf vegetables and only the free vaporizable water that is carried by the leaves of said leaf vegetables in fiberboard cartons each having vent openings at least equal in total area in square inches to substantially .07 to .1 times the number of pounds of lettuce within each carton but which openings are inadequate in cross sectional area to enable substantially free circultaion of air through each carton by convection, then cooling the interiors of said cartons and the leaves of said leaf vegetables within said interiors by evacuation and consequent rapid evaporation of said water to a point above the freezing point of said water and until said leaf vegetables are at a temperature of substantially 32° F. whereby said leaf vegetables will be free from ice, then stopping said evacuation and admitting air at atmospheric pressure to within said interiors and thereafter and before any substantial rise in the temperature within said cartons placing said cartons in a refrigerated atmosphere.

5. The method of packaging leaf vegetables for storage and for shipment that comprises the steps of: packing the freshly harvested leaf vegetables having the field heat therein and having only the free vaporizable moisture carried by the leaves of said leaf vegetables into cartons having opposed walls and under pressure to cause at least two of said opposed walls to bulge outwardly, packing said cartons in tiers and in adjacent stacks with the bulged walls of the cartons in said stacks in substantially meeting relation at the outermost portions of the bulges to provide secondary air passageways along said portions between correponding cartons in said adjacent stacks, providing primary air passageways into said cartons independently of said secondary air passageways, and in communication with said secondary air passageways, drawing air from within said cartons through said primary air passageways and through said secondary air passageways in succession to create a reduced pressure within said cartons to accelerate evaporation of said vaporizable moisture on said leaf vegetables and to withdraw the vapors of evaporation from within said cartons, continuing said withdrawal of said vapors until the leaf vegetables are cooled to a predetermined degree below 40° F. and above the freezing point of said water and thereafter reversing the flow of air through said primary and said secondary passageways until the pressure within said cartons is at atmospheric pressure.

References Cited in the file of this patent

UNITED STATES PATENTS

| Number | Name | Date |
| --- | --- | --- |
| 1,018,812 | Dujardin | Feb. 27, 1912 |
| 2,013,712 | Evans | Sept. 10, 1935 |
| 2,164,025 | Schwertfeger | June 27, 1939 |
| 2,344,151 | Kasser | Mar. 14, 1944 |
| 2,345,000 | Newsom | Mar. 28, 1944 |
| 2,351,417 | Ferguson | June 13, 1944 |
| 2,404,065 | Hill | July 16, 1946 |
| 2,449,164 | Haslacher | Sept. 14, 1948 |
| 2,496,731 | Lonzo | Feb. 7, 1950 |

Dedication 2,684,907.—*Rex L. Brunsing*, San Francisco, Calif. METHOD OF SHIPPING LETTUCE AND OF PREPARING LETTUCE AND THE LIKE FOR SHIPMENT. Patent dated July 27, 1954. Dedication filed Aug. 12, 1957, by the assignee, *Western Vegetable Industries, Inc.*

Hereby dedicates to the public the terminal part of said patent subsequent to July 27, 1962.

[*Official Gazette September 10, 1957.*]